United States Patent [19]

Chary et al.

[11] Patent Number: 5,183,150
[45] Date of Patent: Feb. 2, 1993

[54] CARGO DRIVE UNIT WITH A HYSTERESIS COUPLING

[75] Inventors: Henry H. Chary, Rancho Palos Verdes; Thomas F. Fitgibbon, Long Beach; Christopher M. Gibson, Fountain Valley, all of Calif.

[73] Assignee: Allied-Signal Inc., Morris Township, Morris County, N.J.

[21] Appl. No.: 806,686

[22] Filed: Dec. 13, 1991

[51] Int. Cl.⁵ .............................................. B65G 13/02
[52] U.S. Cl. .................................. 198/782; 198/788; 198/791
[58] Field of Search ............... 198/782, 784, 788, 789, 198/791

[56] References Cited

U.S. PATENT DOCUMENTS

| | | |
|---|---|---|
| 1,868,825 | 7/1932 | Grosjean ............................ 198/788 |
| 1,881,267 | 10/1932 | Drexler ............................... 198/788 |
| 1,889,173 | 11/1932 | Drexler ............................... 198/788 |
| 2,175,860 | 10/1939 | Waimann ............................ 198/788 |
| 3,690,440 | 9/1972 | Macpherson . | 
| 3,698,539 | 10/1972 | Schwarzbeck . |
| 3,737,022 | 6/1973 | DeNeefe et al. . |
| 3,741,504 | 6/1973 | Alberti et al. . |
| 4,766,996 | 8/1988 | Gibson . |
| 4,792,037 | 12/1988 | Huber ................................. 198/788 |
| 4,949,837 | 8/1990 | Huber ............................ 198/788 X |
| 5,020,657 | 6/1991 | Huber ............................ 198/788 X |
| 5,033,611 | 7/1991 | Huber ............................ 198/788 X |
| 5,042,645 | 8/1991 | Pritchard ...................... 198/788 X |

*Primary Examiner*—D. Glenn Dayoan
*Attorney, Agent, or Firm*—J. W. McFarland; R. A. Walsh

[57] ABSTRACT

A cargo drive unit which, as part of an array of several such units, it disposed in the hold of a vehicle to permit cargo to be moved within the hold. The drive unit derives power from an electric motor to first erect a drive a roller into contact with a load and then to move the load. A hysteresis coupling is disposed between the motor and the roller and functions to limit the force of the roller against the load to be driven by adjusting the excitation current thereto. The hysteresis coupling allows the roller to retract when the current to the coupling is removed and limits shock loading to drive gearing and the motor when excessive loads are applied to the roller.

21 Claims, 4 Drawing Sheets

CARGO DRIVE UNIT WITH A HYSTERESIS COUPLING

BACKGROUND OF THE INVENTION

This invention relates generally to a cargo drive unit and, particularly, to a cargo drive unit which is part of an array of several such units mounted in the hold of a vehicle for moving cargo within the hold. More particularly, this invention relates to a cargo drive unit of the type described which derives power from an electric motor to first contact and then move the cargo.

Various prior art devices are known which generally address cargo handling. The applicants are aware of several patents directed to this effort.

U.S. Pat. No. 3,741,504 which issued to John Alberti, et al on Jun. 26, 1973 is directed to a cargo handling system incorporating power drive conveyor means and utilizing a center automatic guide restraint in coordination with a side locking arrangement, and specifically suited for loading and unloading freighter airplanes.

U.S. Pat. No. 3,690,440 which issued on Sep. 12, 1972 to Duncan H. MacPherson is directed to a drive roller assembly for propelling loads in which a power driven roller or a plurality of rollers coupled universally in series are mounted independently at each end of a roller, each mounting including a cam to elevate the adjacent end of a roller and each cam being operated by a clutch arrangement.

U.S. Pat. No. 3,698,539 which issued to John Schwarzbeck on Oct. 17, 1982 relates to a torque controlled power roller for a conveyor system. This invention provides a compact power roller for installation in a shallow recess of a platform conveyor system. The platform is provided with rollers, balls, casters, air lift means, or other support means, enabling movement thereof of cargo or baggage containers or other objects, transportable over the system.

U.S. Pat. No. 3,737,022 which issued on Jun. 5, 1973 to John H. DeNeefe relates to a rapid retracting torque activated drive roller unit for conveyor systems. A power roller is disclosed which is adapted to be mounted below a conveyor plane and comprises a roller mounted for rotational movement in either direction and for translational movement toward and away from said plane. A power source is provided which both rotates the roller and translates it into frictional contact with a load disposed on the conveyor plane. The roller is retractable out of contact with the load upon de-energization of the power source.

U.S. Pat. No. 4,766,996 which issued to Christopher M. Gibson, one of the present inventors, on Aug. 30, 1988 relates to a roller for use in the cargo bay of an aircraft and which roller is constructed with chopped fiber strands incorporated into a rubber base and oriented in a substantially circumferential direction around the hub of the roller to provide reinforcement to the rubber base.

It will be discerned that while the aforementioned prior art devices are generally directed to cargo handling arrangements, the particular structure of the present invention is not shown or otherwise disclosed.

SUMMARY OF THE INVENTION

This invention contemplates a cargo drive unit with a hysteresis coupling, wherein the hysteresis coupling is disposed between an electric motor and a drive roller. The hysteresis coupling includes a toothed hub (the input), a permanent magnet cup surrounding the toothed hub (the output), and an electrically energized toothed stator shrouding the cup. The arrangement is such that a torque is developed between the input and the output which is proportional to the current applied to the stator. The purpose of the hysteresis coupling is to limit the thrust of the roller against a load to be driven by adjusting the stator excitation current. In addition, the roller is allowed to retract momentarily by slipping the hysteresis coupling whenever excessive loads are applied to the roller. Thus, shock loading to the gearing and to the motor is limited. The hysteresis coupling eliminates three components which are required by prior art drive units (1) a permanent magnet coupling which cannot be modulated or switched off; (2) a solenoid operated dog clutch which isolates the output from the permanent magnet coupling; and (3) a spring type clutch which absorbs excessive energies created by high impacts to the drive roller.

Accordingly, this invention contemplates a cargo drive unit of the type which is part of an array of several such units for driving a load from one transportable location to another comprising: an electric motor; load driving means; means for coupling the load driving means to the motor so that said motor drives said load driving means; coupling means disposed between the motor and the load driving means and including input means coupled to the motor, output means coupled to the load driving means and current responsive means arranged with the input and output means; means for applying current to the current responsive means, whereupon a force is developed between the input and the output means which is proportional to said current applied to said current responsive means, said force affecting the driving of the load driving means by the motor; and means for adjusting the current applied to the current responsive means for adjusting the force of the load driving means against a load.

DETAILED DESCRIPTION OF THE INVENTION

Figure 1:
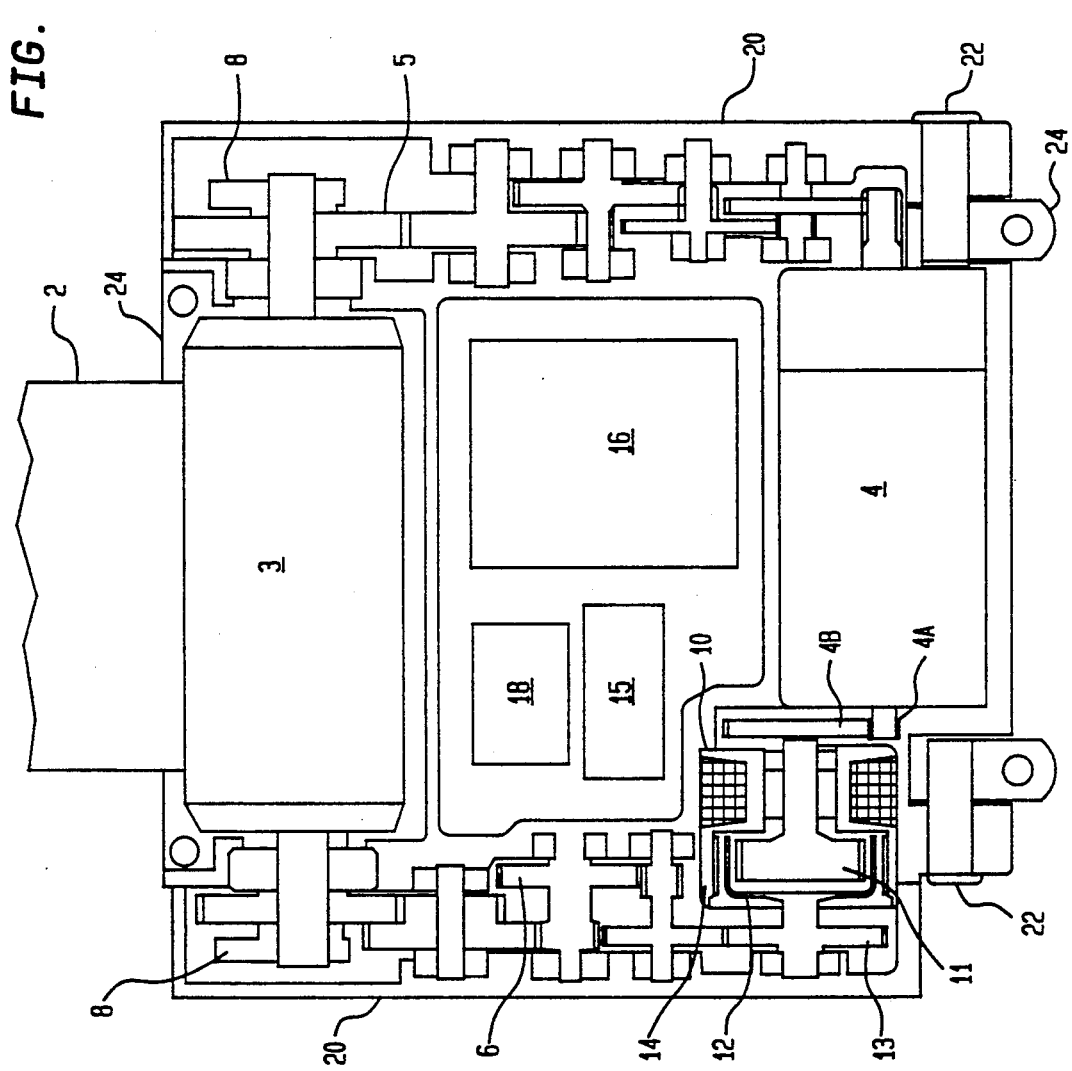
FIG. 1 is a diagrammatic representation generally showing a cargo drive unit in accordance with the invention.

With particular reference to FIG. 1, a cargo drive unit is designated by the numeral 1. Cargo drive unit 1 is part of an array of several such units which drive a load 2 from one transportable location to another within, for example, the hold of an aircraft, frictionally as by contact with a roller 3. In this regard, roller 3 may be of the type described in the aforenoted U.S. Pat. No. 4,766,996.

Roller 3 is erected into contact with load 2 by an electric motor 4 through a dedicated erection gear arrangement 6 coupled to motor 4. Gear arrangement 6 drives a set of cams 8. Once roller 3 is in contact with load 2, the driving effort is likewise provided by motor 4, which includes a brake assembly (to be hereinafter referred to), through separate power gearing 5.

Motor 4 is connected to the set of cams 8 through a hysteresis coupling 10 including a toothed hub 11 which is either coupled to shaft 4A of motor 4 directly or through intermediate motor shaft gearing 4B as shown in FIG. 1, a permanent magnet cup 12 and an electrically energized internally toothed stator 14 shrouding cup 12. The torque transmitted from toothed hub 11 to permanent magnet cup 12 and to an output gear 13 is proportional to the current in the windings of internally toothed stator 14.

When the output of hysteresis coupling 10 (permanent magnet cup 12) is constant (before the current to the coupling is switched off) cup 12 is positionally magnetized in as many places as there are pole pairs between stator 14 and the input rotor of coupling 10. The magnetism in the permanent magnet cup 12, after switch-off is then sufficiently high, up to approximately ten percent of the torque developed prior to switch-off, so that the requirement for free fall of the drive roller may not be met.

In order to reduce the residual torque to zero at current switch-off, the DC current input to the coupling has to be reduced sinusoidally to zero using a decay circuit 15.

It will be understood that all mechanical and electrical elements such as circuit 15, a switch gear 16 and rectifiers 18 are built into a frame 20. Frame 20 is hinged with pins 22 to a mounting base 24, allowing the frame assembly to be erected under normal operating conditions or to be lifted manually for inspection and maintenance without removing mounting base 24.

Figure 2:
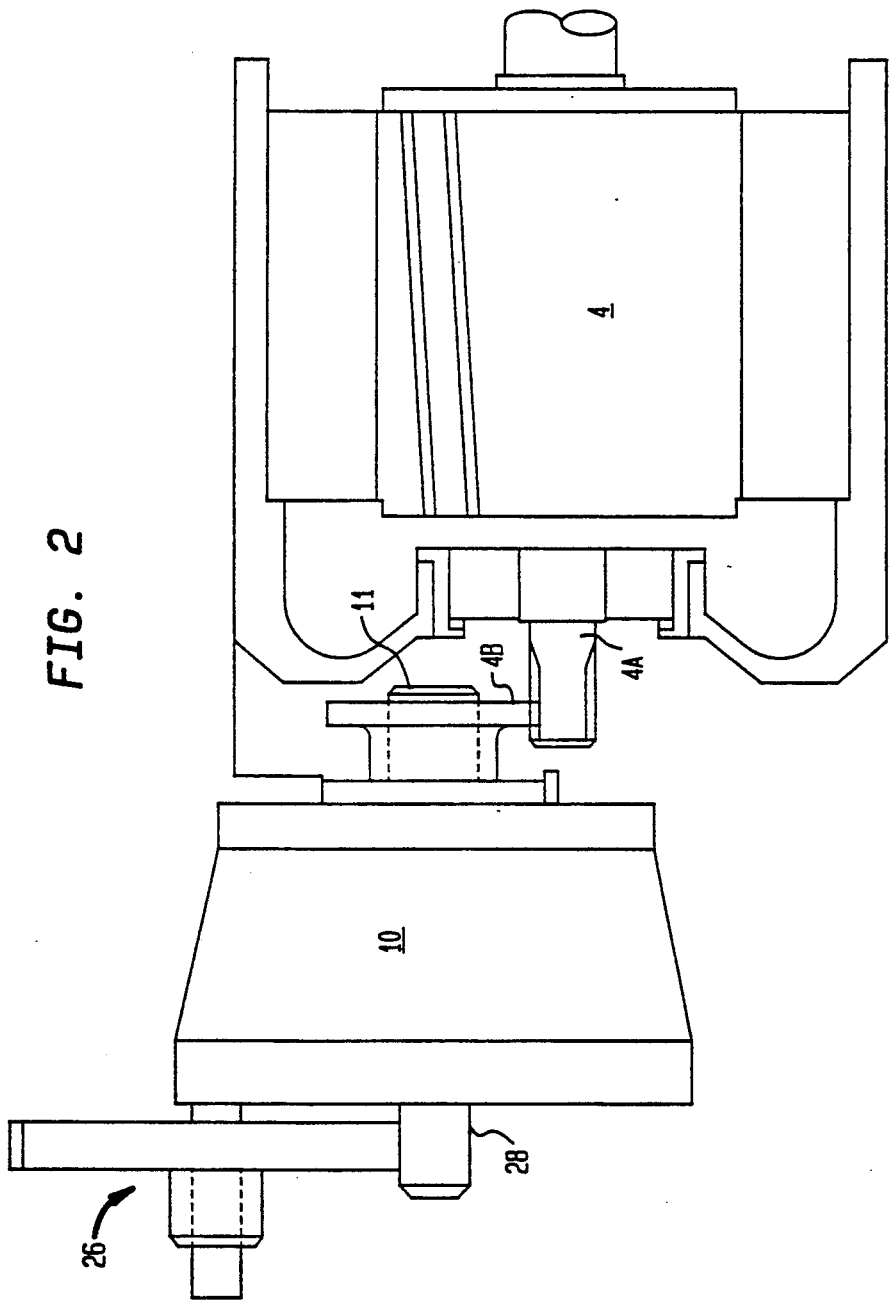
FIG. 2 is a diagrammatic representation more specifically showing the relationship between a hysteresis coupling and a drive motor according to the invention.

FIG. 2 shows the particular structural arrangement between drive motor 4 and hysteresis coupling 10. Thus, toothed hub 11 of hysteresis coupling 10 is coupled to shaft 4A of motor 4 through intermediate gearing 4B as referred to and shown in FIG. 1. An erection and retraction drive gear train 26 is in engagement with a hysteresis coupling gear 28. Drive train 26 is, in turn, in meshing engagement with gear arrangement 6 shown in FIG. 1.

Figure 3:
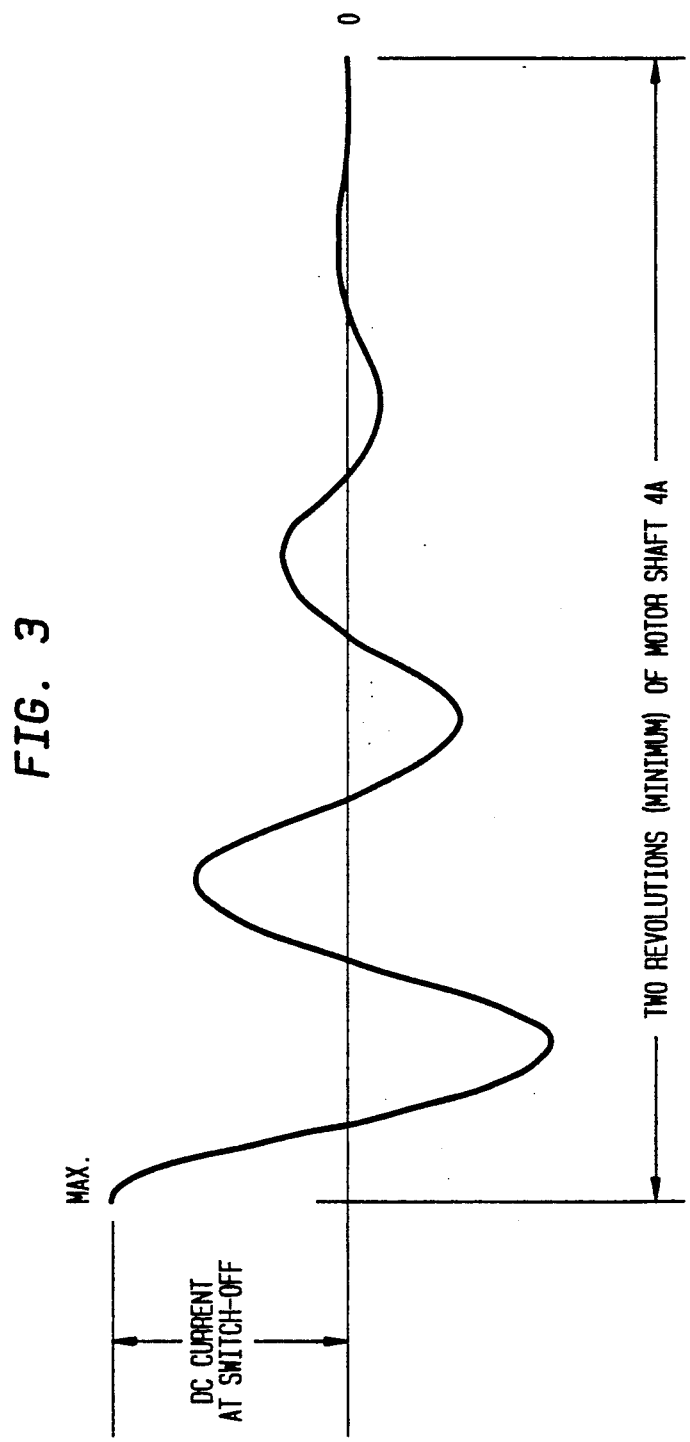
FIG. 3 is a graphical representation showing DC current at switch-off during its decay time to zero current for the hysteresis coupling.

As heretofore noted, at drive unit switch off residual torque is reduced to zero via sinusoidal current circuit 15. This feature of the invention is illustrated in FIG. 3. Thus, the DC current of circuit 15 is at a maximum at current switch off and thereafter decays to zero during, for example, two revolutions (minimum) of motor shaft 4A.

Figure 4:
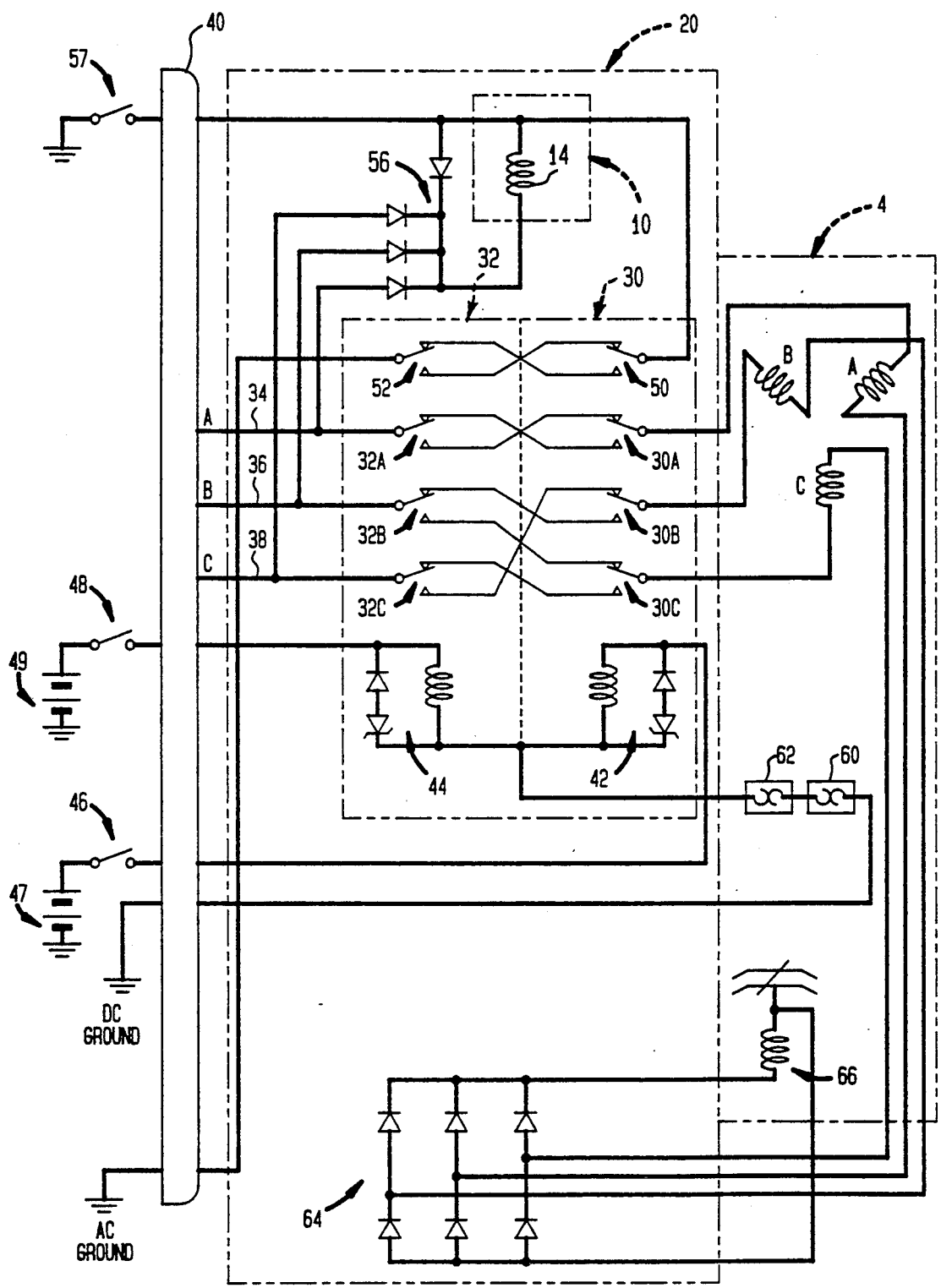
FIG. 4 is a schematic diagram showing the electrical features of the invention.

With reference to FIG. 4, motor 4 is a three-phase motor with the phase windings designated as A, B and C. Phase windings A, B and C are connected to relays 30A, 30B and 30C, respectively, in a particular relay arrangement 30. Relays 30A, 30B and 30C are connected to relays 32A, 32B and 32C, respectively, in a particular relay arrangement 32. Relays 32A, 32B and 32C are connected through conductors 34, 36 and 38 to a control panel 40.

Relay arrangement 30 includes a drive control circuit 42 and relay arrangement 32 includes a drive control circuit 44. Drive control circuit 42 is connected through control panel 40 to a normally open drive control switch 46 connected to a DC source 47 and drive control circuit 44 is connected through control panel 40 to a normally open drive control switch 48 connected to a DC source 49. In the arrangement described, one of the switches 46 and 48 is closed to drive motor 4 in one direction as when switch 46 is closed, and in the opposite direction as when switch 48 is closed.

Relay arrangement 30 includes a relay 50 connected to stator (coil) 14 of hysteresis coupling 10. Relay 50 is connected to a relay 52 in relay arrangement 32. Relay 52 is connected to AC ground. A half-wave rectifier 56 is connected to AC conductors 34, 36 and 38, and supplies DC to hysteresis coupling stator coil 14. A control switch 57 permits manual operation of hysteresis coupling 10.

A full wave rectifier 64 is connected to phase windings A, B and C of motor 4 and is connected to a motor brake 66.

Motor brake 66 is of the type which includes friction discs brought into close contact by one or more compression springs. The discs decelerate the rotor of motor 4 and provide a holding torque when the electric supply to the motor is interrupted. Brake 66, acting through power gearing 5, prevents roller 3 from rotation when reverse loaded by cargo load 2.

When motor 4 is re-energized, full wave rectifier 64 operates a solenoid within the brake assembly, releasing the brake by reacting the spring force.

The same brake holds roller 3 in its erected position, ensuring close contact of the roller against load 2. For this to be effective, hysteresis coupling 10 must be electrically energized.

Built into motor 4 are two thermal switches 60 and 62. These switches prevent overheating due to overload or stalling. Connected in series with drive control circuits 42 and 44, thermal switches 60 and 62, on sensing overtemperature conditions, will trip relay arrangements 30 and 32, thus de-energizing motor 4. On cooling, normal operation will automatically be resumed.

Relay arrangements 30 and 32, hysteresis coupling 10, drive control circuits 42 and 44, rectifier 56, rectifier 64 and motor brake 66 are built into frame 20 which includes a printed circuit board.

It will now be recognized that hysteresis coupling 10 is electrically energized so as to have the advantage of adjustability. That is to say, the input current to stator coil 14 can be changed which directly changes the extent of the coupling and therefore the output torque transmitted through the device of the invention. Further, this results in a direct change in the upward lift of the device and also the tractive force supplied by the cargo drive unit.

Thus, by applying current control within the drive unit circuit to hysteresis coupling 10, which is adjustable by an operator through control panel 40, the operator can adjust the current to the hysteresis coupling and thereby adjust, as necessary the tractive force of each of the drive units such as that herein described, which are arranged in an array in a cargo bay or hold. It will be appreciated that this allows the operator to adjust the tractive force as necessary for a variety of conditions such as wet and/or icy bottom containers, excessively heavy or extremely light containers, fragile cargo, etc., and still allows the dropping out of contact of each of the drive units when power is terminated via operation of switches 46 or 48, as the case may be.

Switch 57 can independently operate hysteresis coupling 10 without starting motor 4 as will now be recognized.

With the above description of the invention in mind, reference is made to the claims appended hereto for a definition of the scope of the invention.

What is claimed is:

1. A cargo drive unit of the type which is part of an array of several such units for driving a load from one transportable location to another, said cargo drive unit comprising:
   an electric motor having an output shaft;
   load driving means for first contacting and then driving a load;
   coupling means disposed between the motor and the load driving means and including input means coupled to the motor shaft, output means coupled to the load driving means and current responsive means arranged with the input and output means;
   means for applying current to the current responsive means, whereupon a force is developed between the input and the output means which is proportional to said current applied to said current responsive means, said force affecting the driving of the load driving means by the motor; and
   means for adjusting the current applied to the current responsive means for adjusting the force of the load driving means against a load.

2. A cargo drive unit as described by claim 1, including:
   the coupling means disposed between the motor and the load driving means being a hysteresis coupling;
   the input means being a hysteresis coupling hub coupled to the output shaft of the electric motor;
   the output means being a permanent magnet cup coupled to the load driving means;
   the current responsive means being a wound stator having coil means and shrouding the permanent magnet cup; and
   means for transmitting torque from the hub to the cup, said torque being proportional to the current in the stator coil means.

3. A cargo drive unit as described by claim 2, including:
   the hysteresis coupling hub being a toothed hub;
   the motor output shaft being a toothed shaft; and
   gear means in meshing engagement with the toothed hub and with the toothed shaft for coupling the hub to the shaft.

4. A cargo drive unit as described by claim 1, including:
   a gear train coupled to the gear means;
   a dedicated gear arrangement coupled to the motor shaft; and
   the gear train being in meshing engagement with the dedicated gear arrangement for erecting the load driving means for contacting the load and for retracting said load driving means.

5. A cargo drive unit as described by claim 2, including:
   circuit means connected to the coil means for reducing the current in the coil means and hence the residual torque to substantially zero when the means for applying current to the coil means is rendered off.

6. A cargo drive unit as described by claim 5, wherein:
   the current in the coil means is at a maximum when the means for applying current to the coil means is rendered off; and
   thereafter the current in the coil means decays to substantially zero during a predetermined minimum number of revolutions of the motor shaft.

7. A cargo drive unit as described by claim 1, including:
   a relay arrangement connected to the motor and including first and second drive control circuits;
   first normally open switching means connected to the first drive control circuit;
   second normally open switching means connected to the second drive control circuit;
   one of the normally open first and second switching means being closed to actuate the corresponding one of the first and second drive control circuits and the relay arrangement for driving the motor shaft in one direction; and
   the other of the normally open first and second switching means being closed to actuate the corresponding other of the first and second drive control circuits and the relay arrangement for driving the motor shaft in the opposite direction.

8. A cargo drive unit as described by claim 7, wherein:
   the relay arrangement includes relay means connected to the coil means; and
   third normally open switching means are connected to the relay means, said third normally open switching means being closed for operating the hysteresis coupling independent of the motor.

9. A cargo drive unit as described by claim 7, wherein the motor is an AC motor and the drive unit includes:
   half-wave rectifier means connected to the relay arrangement and to the coil means for supplying DC to the coil means.

10. A cargo drive unit as described by claim 7, wherein:
    the motor includes thermal responsive means; and
    said thermal responsive means being connected to the first and second drive control circuits in the relay arrangement and sensing excessive operating temperature conditions, and for thereupon actuating the relay arrangements for de-energizing the motor.

11. A cargo drive unit for driving a load from one transportable location to another, comprising:
    an electric motor having an output shaft;
    roller means for first contacting and then driving a load;
    hysteresis coupling means disposed between the motor and the roller means and including input means coupled to the motor output shaft, magnetic output means coupled to the roller means and a stator having coil means and arranged with the input and output means;
    means for applying current to the coil means, whereupon a force is developed between the input means and the magnetic output means which is proportional to the current applied to the coil means, said force being effective for first erecting the rotor means to contact the load and then rotating the roller means to drive said load; and
    means for adjusting the current applied to the stator coil for adjusting the force developed between the input means and the magnetic output means.

12. A cargo drive unit as described by claim 11, including:
    the input means being toothed means;
    the motor output shaft being a toothed shaft; and
    gear means in meshing engagement with the toothed input means and with the toothed output shaft for coupling the input means to the shaft.

13. A cargo drive unit as described by claim 11, including:

a gear train coupled to the gear means;
a dedicated gear arrangement coupled to the motor output shaft; and
the gear train being in meshing engagement with the dedicated gear arrangement for erecting the roller means to contact the load and for retracting the roller means.

14. A cargo drive unit as described by claim 11, including:
circuit means connected to the coil means for reducing the current in the coil means and hence the residual torque to substantially zero when the means for applying current to the coil means is rendered off.

15. A cargo drive unit as described by claim 14, wherein:
the current in the coil means is at a maximum when the means for applying current to the coil means is rendered off; and
thereafter the current in the coil means decays to substantially zero during a predetermined minimum number of revolutions of the motor shaft.

16. A cargo drive unit as described by claim 11, including:
a relay arrangement connected to the motor and including first and second drive control circuits;
first normally open switching means connected to the first drive control circuit;
second normally open switching means connected to the second drive control circuit;
one of the normally open first and second switching means being closed to actuate the corresponding one of the first and second drive control circuits and the relay arrangement for driving the motor shaft in one direction; and
the other of the normally open first and second switching means being closed to actuate the corresponding other of the first and second drive control circuits and the relay arrangement for driving the motor shaft in the opposite direction.

17. A cargo drive unit as described by claim 16, wherein:
the relay arrangement includes relay means connected to the coil means; and
third normally open switching means are connected to the relay means, said third normally open switching means being closed for operating the hysteresis coupling independent of the motor.

18. A cargo drive unit as described by claim 16, wherein the motor is an AC motor and the drive unit includes:
half-wave rectifier means connected to the relay arrangement and to the coil means for supplying DC to the coil means.

19. A cargo drive unit as described by claim 16, wherein:
the motor includes thermal responsive means; and
said thermal responsive means being connected to the first and second drive control circuits in the relay arrangement and sensing excessive operating temperature conditions, and for thereupon actuating the relay arrangements for de-energizing the motor.

20. A cargo drive unit as described by claim 1, wherein the electric motor includes:
a rotor; and
braking means for decelerating the rotor and for providing a holding force when power to the motor is interrupted, and for inactivating the load driving means when said load driving means is reverse loaded by the load.

21. A cargo drive unit as described by claim 11, wherein the electric motor includes:
a rotor; and
braking means for decelerating the rotor and for providing a holding force when power to the motor is interrupted, and for preventing rotation of the roller means when said roller means is reverse loaded by the load, and for maintaining the roller means erected against the load when current is not applied to the brake coil means.

* * * * *